United States Patent [19]

Miura

[11] 3,708,988
[45] Jan. 9, 1973

[54] FENDER ASSEMBLY
[75] Inventor: Misao Miura, Yokohama, Japan
[73] Assignee: Siebu Gomu Kagaku Kabushiki Kaisha, Tokyo, Japan
[22] Filed: May 21, 1970
[21] Appl. No.: 39,392

[30] Foreign Application Priority Data

Sept. 18, 1969 Japan..................................44/74459

[52] U.S. Cl. ..........................61/48, 114/219, 256/1, 267/140
[51] Int. Cl. ................................................E02b 3/22
[58] Field of Search ...61/48; 114/219; 267/140, 141; 293/1, 51 F, 52 F; 256/13.1, 1

[56]  References Cited

UNITED STATES PATENTS 3,563,525  2/1971  Narabu................................61/48 X
3,533,242  10/1970  Narabu..................................61/48
3,335,689  8/1967  Hein....................................114/219
3,418,815  12/1968  Kumazawa..............................61/48
3,507,123  4/1970  Miura..................................61/48

FOREIGN PATENTS OR APPLICATIONS 1,570,438  5/1969  France..................................61/48
1,355,659  2/1964  France................................114/219

Primary Examiner—David J. Williamowsky
Assistant Examiner—David H. Corbin
Attorney—Wenderoth, Lind and Ponack

[57]  ABSTRACT

A fender assembly to be mounted on the surface of a quay-wall as found in harbors or dockyards comprises two pairs of rubber elements each having a plate like trapezoid shape and a rigid impact receiving plate. The pairs of rubber elements are adapted to be secured on to the surface of the quay-wall so that they form together a frustum of a quadrilateral pyramid widening towards the quay-wall surface. The impact receiving plate is rigidly secured on to the top of the pairs of rubber elements.

1 Claim, 5 Drawing Figures

PATENTED JAN 9 1973

3,708,988

MISAO MIURA
INVENTOR

BY Wenderoth, Lind & Ponack
ATTORNEYS

FENDER ASSEMBLY

BACKGROUND OF THE INVENTION

The present invention relates to a fender, and more particularly to a rubber fender assembly such as to be installed on the surface of a quay-wall in harbors or dockyards to protect against possible damage to the ship hull due to impact.

With the size of ships becoming larger and larger, requirements for development of fenders with safer and higher performance have recently been mounting. A rubber fender assembly must be able to sufficiently absorb the kinetic energy occurring in the case of the ship being brought into contact with the quay-wall. Also, the rubber material's deformation caused by the impact must be normal and stable. The modern fenders are designed with particular attention to the compressive stresses generated in both the impact receiving surface of the fender assembly and the outside plating of the ship hull due to the impact force occurring when the ship comes into contact with the impact receiving plate of the fender, and it is made prerequisite that the compressive stress does not exceed the allowable compressive stress of the hull. Therefore, in order to reduce the compressive stress generating in the fender by enlarging the area of its impact receiving surface, it is becoming common to adopt such a construction as to mount on it a rigid impact receiving plate.

Such rubber fender assemblies now under use are composed of V- or H-shaped or the like longitudinal hollow rubber tubes with their longitudinal directions being disposed in parallel to the surface of the quay-wall and a pair of such portions of the rubber tubes that elastically deform upon receipt of an impact force from the ship when it comes into contact with the impact receiving surface of the fender assembly are arranged in parallel to each other. And further, such rubber fender assemblies are integrally provided with impact receiving plates in order to reduce the compressive stresses when an impact force is exerted thereon. However, with such a rubber fender assembly, when it is subjected to a force parallel with its impact receiving plate, that is, a component of a force parallel to the longitudinal direction of the surface of the quay-wall such as generated by a ship when it contacts it obliquely, or a friction force exerting between the impact receiving plate and the outside plating of the ship hull when the ship is moved alongside the quay-wall or a force due to the weight etc. of the impact receiving plate exerting orthogonally to the longitudinal direction of the fender assembly, it easily deforms traversely. Under this condition, if an impact force from the ship is exerted simultaneously on the impact receiving plate of the fender assembly at right angles thereto, the fender becomes unstable without making normal deformation. Accordingly, the fender assembly cannot absorb the kinetic energy as required, resulting in a reduction in its performance, possibly to be followed by damage to the hull.

SUMMARY OF THE INVENTION

It is an object of the present invention to provide an improved fender assembly to be installed on the surface of the quay-wall of a harbor or dockyard which does not have these deficiencies.

A further object of the present invention is to provide a rubber fender assembly which can sufficiently absorb the kinetic energy of the ship when it is to be tied up alongside the quay-wall and the deformation of the rubber elements constituting part thereof caused by the ship's contact with the quay-wall is normal and stable.

Another object of the present invention is to provide a rubber fender assembly which does not easily deform laterally when it is subjected to an oblique force relative to the direction of its impact receiving plate, and deforms normally even when it is simultaneously subjected to an impact normal to its impact receiving plate.

The rubber fender assembly of the present invention is preferably composed of two pairs of rubber elements each generally having a plate like trapezoid shape and an impact receiving plate made of a rigid material such as steel plate. Each rubber element constituting the respective pairs of rubber elements is adapted to be secured on the surfaces of the quay-wall oppositely to form together a frustum of a quadrilateral pyramid widening towards the surface of the quay-wall. The impact receiving plate is adapted to be secured to the upper ends of the rubber elements so that its outer face is parallel to the surface of the quay-wall. Thus, in the rubber fender assembly according to the present invention, even when it is subjected to an impact having a component parallel to the impact receiving plate, a shearing elastic resistive force is exerted on to the ship from some of the rubber elements regardless of the fender assembly being mounted in a longitudinal direction or a transversal direction relative to the direction of the quay-wall, because, since, in the present fender assembly, four rubber elements are disposed orthogonally to each other so that they form a frustum of a quadrilateral pyramid widening towards the surface of the quay-wall, there always exists at least one pair of rubber elements which are disposed to be deformed in the direction of said parallel component. Accordingly in this case, the fender assembly behaves as if its impact receiving plate were applied with only an impact orthogonal thereto, as the result of which the quantity of the absorbing energy is not reduced as in the conventional fenders and it works at its maximum capacity. Further, since the fender assembly according to the present invention has its four rubber elements made to generally form a frustum of a quadrilateral pyramid widening towards the surface of the quay-wall, it is highly stable against the external force regardless of its direction.

In addition, in the fender assembly according to the present invention, the construction for mounting the impact receiving plate is such that it causes the impact receiving plate to act as a bidirectional board supported at four sides by four rubber members unlike the impact receiving plate of conventional fenders which acts as a monodirectional board supported at two sides. Accordingly, the modulus of section of the impact receiving plate of the rubber fender assembly according to the present invention can be reduced by about 40 percent or more compared with that of the conventional ones.

BRIEF DESCRIPTION OF THE DRAWINGS

Other objects and advantages of this invention will become apparent from the following description taken in connection with the accompanying drawings, wherein there is set forth by way of illustration an embodiment of this invention. In the drawings.

DESCRIPTION OF THE PREFERRED EMBODIMENT

Figure 1:
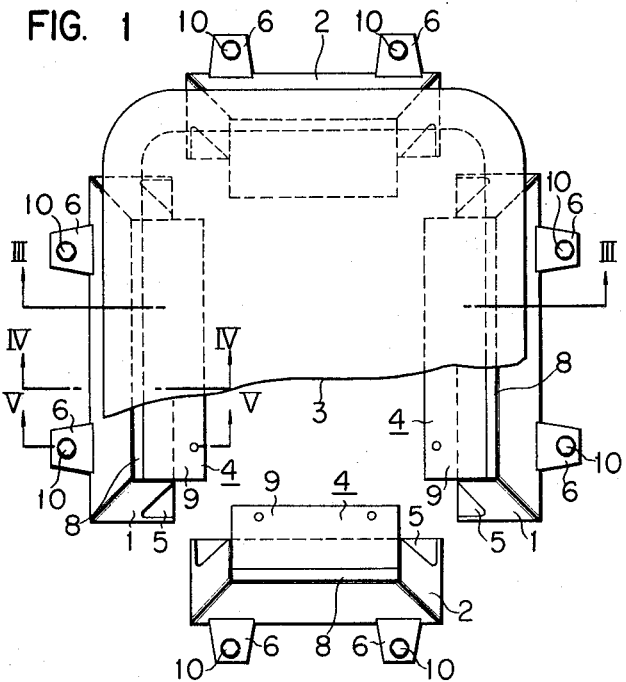
FIG. 1 is a front elevational view of a rubber fender assembly according to the present invention, partially broken away.
Figure 2:
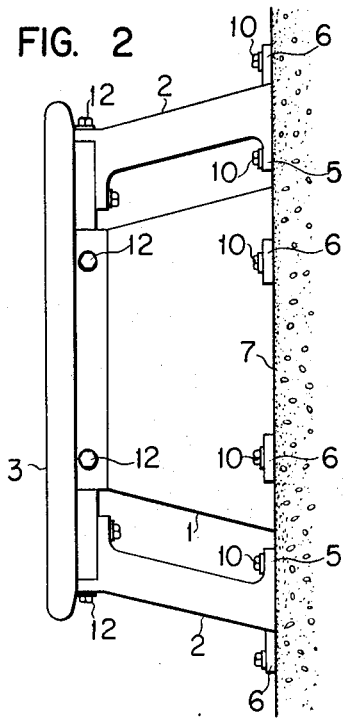
FIG. 2 is a side elevational view of the fender assembly shown in FIG. 1.
Figure 3:
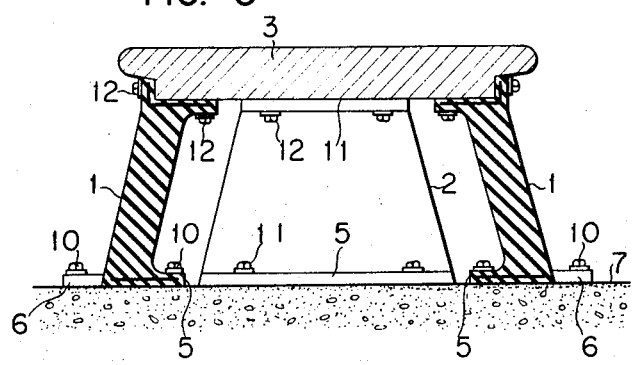
FIG. 3 is a sectional view of the fender assembly shown in FIG. 1 taken along the line III—III of FIG. 1.

Referring to FIGS. 1 to 3, the fender assembly of the present invention comprises two pairs of rubber elements 1 and 2 and an impact receiving plate 3. Each of the rubber elements 1 and 2 has a plate like trapezoid shape and its upper end is formed with a L-shaped abutment 4 at its inner side in order to be adapted to mount the impact receiving plate 3 when assembled, while at its flat bottom portion there are formed an inner longitudinal flange 5 and outer lugs 6,6 both being adapted to mount it on the surface of a quay-wall 7. Ribs 8 and 9 form the upright and horizontal walls of abutment 4. Flanges 5 as well as lugs 6 are all provided with one or more holes to pass bolts 10 therethrough for securing the rubber elements 1 and 2 to the surface of the quay-wall 7. The impact receiving plate 3 is made of rigid material such as steel or the like and has generally a rectangular shape.

In assembling the fender, after the respective pairs of the rubber elements 1 and 2 are rigidly secured to the surfaces of the quay-wall 7 by fastening the bolts 10 passed through the bolt holes formed in flanges 5 or lugs 6 so that each one of the respective pairs of the rubber elements 1 and 2 is disposed oppositely so that the rubber elements 1 and 2 define together a frustum of a quadrilateral pyramid widening towards the quay-wall surface, the impact receiving plate 3 is mounted on the tops of the respective rubber elements 1 and 2 with its bottom stepped surface 11 being mounted on abutments 4 formed on the upper ends of the respective rubber elements 1 and 2. The plate 3 is rigidly secured by bolts 12 screwed into it through upright ribs 8 and horizontal ribs 9 of the respective rubber elements 1 and 2.

Figure 4:
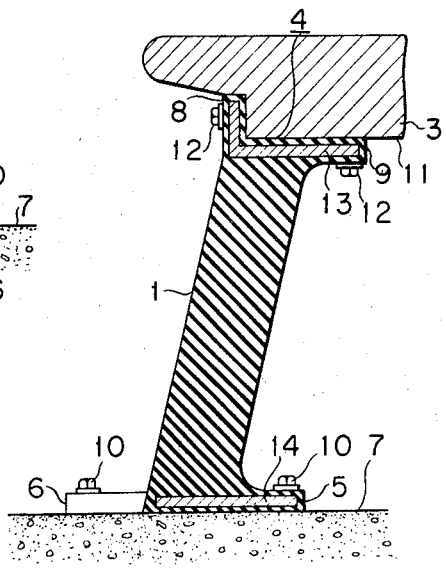
FIG. 4 is a partial sectional view of the rubber element constituting part of the fender assembly shown in FIG. 1 taken along the line IV—IV of FIG. 1, in a larger scale.
Figure 5:
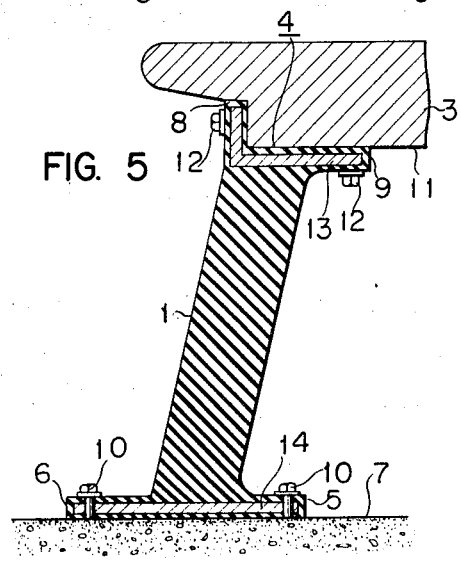
FIG. 5 is a view similar to FIG. 4, but taken along the line V—V of FIG. 1.

As shown in FIGS. 4 and 5, each of the rubber elements 1 and 2 has embedded therein L-shaped and flat metal braces 13 and 14 for reinforcing abutment 4 and flange 5, whereby the braces 13 and 14 are formed with bolt holes to facilitate the insertion of the fastening bolts 10 or 12.

It will be appreciated that the L-shaped metal brace 13 has its upright rib disposed along the outside surface of the rubber elements 1 or 2 so as not to prevent them from deforming when impacted from ships, thereby ensuring that the deformations of the rubber elements 1 or 2 are made large.

While there has been described and illustrated herein a preferred embodiment of the invention, it will be understood that other changes and modifications can be made in the present invention and therefore it is understood that all changes, equivalents, and modifications within the spirit and scope of the present invention are here meant to be included in the appended claims.

What is claimed is:

1. A fender assembly attached to the surface of a quay-wall in a harbor or a dockyard, said assembly comprising a first pair of deformable elements mounted at the lower portions thereof on said surface parallel to each other; a second pair of deformable elements mounted at the lower portions thereof on said surface parallel to each other and orthogonal to said first pair of elements; each of said elements having a plate-like trapezoid shape; said first and second pairs of elements mounted symmetrically on said surface to define together a frustum of a quadrilateral pyramid widening toward said surface; the upper portions of each of said elements including horizontal and vertical ribs forming an L-shaped abutment; the abutments of each of said pairs of elements facing each other; each of said L-shaped abutments having imbedded therein an L-shaped metal brace for reinforcing said respective abutment; and a rigid impact receiving plate secured to said abutments.

* * * * *